(12) United States Patent
Li et al.

(10) Patent No.: US 12,181,742 B2
(45) Date of Patent: Dec. 31, 2024

(54) DISPLAY DEVICE

(71) Applicants: Hefei BOE Optoelectronics Technology Co., Ltd., Anhui (CN); BOE Technology Group Co., Ltd., Beijing (CN)

(72) Inventors: Hu Li, Beijing (CN); Tingfei Wang, Beijing (CN); Liangliang Zheng, Beijing (CN); Hai Kang, Beijing (CN); Douqing Zhang, Beijing (CN); Zhao Dong, Beijing (CN); Xuemei Zhao, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/277,980

(22) PCT Filed: Feb. 23, 2021

(86) PCT No.: PCT/CN2021/077513
§ 371 (c)(1),
(2) Date: Aug. 18, 2023

(87) PCT Pub. No.: WO2022/178681
PCT Pub. Date: Sep. 1, 2022

(65) Prior Publication Data
US 2024/0126112 A1 Apr. 18, 2024

(51) Int. Cl.
*G02F 1/1335* (2006.01)
(52) U.S. Cl.
CPC .................... *G02F 1/133504* (2013.01)

(58) Field of Classification Search
CPC ............. G02F 1/133504; G02F 1/1335; G02F 1/1336; G02F 1/133602; G02F 1/133603;
(Continued)

(56) References Cited

U.S. PATENT DOCUMENTS 8,465,193 B1 * 6/2013 Arik ................ G02B 5/021
　　　　　　　　　　　　　　　　362/618
9,110,207 B2 * 8/2015 Zhao ............... G02B 5/0226
(Continued)

FOREIGN PATENT DOCUMENTS

CN　　　1423138 A　　6/2003
CN　　　1568435 A　　1/2005
(Continued)

OTHER PUBLICATIONS

PCT/CN2021/077513 international search report.

*Primary Examiner* — Bao Q Truong
(74) *Attorney, Agent, or Firm* — IPro, PLLC

(57) ABSTRACT

A display device, including a backlight module (1). The backlight module (1) includes an optical film layer (2), the optical film layer (2) includes at least two diffusers (21) stacked in sequence, and the haze of each diffuser (21) is 80%-99%. The backlight module (1) further includes an LED light source (3), and the optical band of the LED light source (3) is greater than 455 nm. The display device further includes a cover plate (5) and at least one anti-reflection layer (7), the cover plate (5) is provided with an atomization layer (51), and the anti-reflection layer (7) is located on the side of the cover plate (5) facing away from a display panel (4).

10 Claims, 4 Drawing Sheets

(58) Field of Classification Search
CPC ......... G02F 1/133604; G02F 1/133605; G02F 1/133606; G02F 1/133607; G02F 1/133608
See application file for complete search history.

(56) References Cited

U.S. PATENT DOCUMENTS

| | | |
|---|---|---|
| 2003/0123151 A1 | 7/2003 | Matsunaga et al. |
| 2005/0063062 A1 | 3/2005 | Ito et al. |
| 2009/0185108 A1 | 7/2009 | Park et al. |
| 2012/0307179 A1* | 12/2012 | Nishimura ........ G02F 1/133606 349/62 |
| 2013/0242605 A1 | 9/2013 | Zhao et al. |
| 2018/0247582 A1 | 8/2018 | Park et al. |
| 2021/0003882 A1* | 1/2021 | Lee .................. G02F 1/133607 |

FOREIGN PATENT DOCUMENTS

| | | |
|---|---|---|
| CN | 2916696 Y | 6/2007 |
| CN | 102081177 A | 6/2011 |
| CN | 102508326 A | 6/2012 |
| CN | 102576098 A | 7/2012 |
| CN | 102736146 A | 10/2012 |
| CN | 107621724 A | 1/2018 |
| CN | 107678207 A | 2/2018 |
| CN | 108508968 A | 9/2018 |
| CN | 208818987 U | 5/2019 |
| JP | 2010085501 A | 4/2010 |

\* cited by examiner

DISPLAY DEVICE

CROSS-REFERENCE TO RELATED APPLICATIONS

The disclosure is a National Stage of International Application No. PCT/CN2021/077513, filed on Feb. 23, 2021, which is hereby incorporated by reference in their entireties.

TECHNICAL FIELD

The present application relates to the technical field of display, in particular to a display device.

BACKGROUND

As display devices have been found everywhere in life, time spent on screens by consumers keeps increasing. Long time on light emitting diode (LED) screens will possibly lead to dry eyes, blurred eyes, myopia, etc., particularly for adolescent children whose visual system is underdeveloped. In view of this, a display screen featuring health and eye protection gains increasing popularity among customers.

SUMMARY

The present application discloses a display device for improving a structure of a display screen and achieving a display effect of health and eye protection.

In order to achieve the above objective, the present application provides a technical solution as follows.

A display device includes a backlight module, where the backlight module includes an optical film layer, the optical film layer includes at least two diffusers stacked in sequence, and a haze of each diffuser ranges from 80% to 99%.

Optionally, the optical film layer includes three diffusers.

Optionally, the haze of each diffuser is 98%.

Optionally, the backlight module further includes an LED light source, and the optical band of the LED light source is greater than 455 nm.

Optionally, the optical band of the LED light source is 460 nm.

Optionally, the display device further includes a display panel and a cover plate, where the cover plate is located at a side, facing away from the backlight module, of the display panel.

Optionally, each of corners of two ends of a bezel of a side, close to an integrated circuit chip, of each of the display panel and the backlight module is arranged as a chamfer.

Optionally, the chamfers at the two ends of the display panel and the chamfers at the two ends of the backlight module are aligned, and a chamfer amount of each of the chamfers at the two ends of each of the display panel and the backlight module ranges from 0.5 mm to 5 mm.

Optionally, the cover plate includes an atomization layer, the atomization layer is located at a light-emitting side of the cover plate, and a haze of the atomization layer ranges from 5% to 70%.

Optionally, the haze of the atomization layer is 35%.

Optionally, the atomization layer is formed through a spraying process, a coating process or an etching process.

Optionally, the display device further includes at least one anti-reflection layer, where the at least one anti-reflection layer is located at a side, facing away from the display panel, of the cover plate; a refractive index of each anti-reflection layer falls between a refractive index of the cover plate and a refractive index of air; and in a case that the display device includes two or more anti-reflection layers, refractive indexes of the two or more anti-reflection layers decrease sequentially in a direction away from the cover plate.

Optionally, the display device includes six anti-reflection layers.

Optionally, the display device includes one anti-reflection layer, where a refractive index of the anti-reflection layer is 1.25.

DETAILED DESCRIPTION

Figure 1:
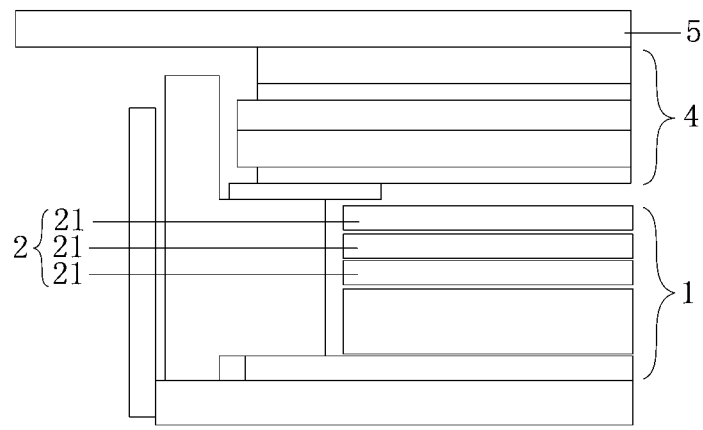
FIG. 1 is a schematic structural diagram of a section of a bezel of a side, not close to an integrated circuit (IC), of a display device according to an embodiment of the present application.

Specifically, damage of a display screen to human eyes is mainly reflected in the following aspects: a viewing angle or brightness, a blue light factor and a glare factor.

The viewing angle or brightness factor has obvious influence on health. Specifically, a too low or too high brightness may cause eye fatigue. In the case of a too low brightness, rod cells play a major role, visual organs are over-regulated, and a ciliary muscle is caused to be in a state of constant tension and then accommodative fatigue is caused. In the case of a too high brightness, a pupil sphincter muscle is in a long-term tired contraction state, narrowing pupils and limiting amount of light entering eyes, and thus causing asthenopia. A conventional liquid crystal display (LCD) screen is likely to cause accommodative fatigue due to rapid attenuation of the brightness along with change of the viewing angle (the brightness attenuates by 50% when the viewing angle deviates by 20 degrees). However, if a specific viewing angle is kept, a cervical disease and myopia may be caused as a result of fixed posture.

Blue light possibly causes ametropia, macular degeneration, dry eyes, cataracts, decreased sleep quality, skin aging, etc. According to the national standard *GBT20145-2006_Photobiological Safety of Lamps and Lamp Systems*, quantitative computation of the blue light hazard is to multiply and accumulate spectral intensities between 300 nm and 700 nm by a blue light hazard weighting function (see FIG. 6 for a blue light hazard weighting function curve), and a main hazard comes from a band range of 420 nm-460 nm.

The glare refers to a visual phenomenon that causes uncomfortable feeling or reduces an ability to observe details or objects due to inappropriate brightness distribution or brightness range in the field of vision (such as extreme contrast). The glare of the LCD display screen can cause an image display ability to be attenuated, and one eye or two eyes may suffer from temporary discomfort and decreased vision. Besides, muscles inside and outside eyes immediately increase by certain tension and make constant adjustments, increasing an eye movement load and causing eye muscle (especially the ciliary muscle) fatigue.

To sum up, compared with traditional paper display media, the conventional LCD display screen has the following features: the larger a viewing angle is, the lower the brightness is, and the smaller a viewing angle range is; blue light hazards are serious; and obvious glare exists. See Table 1 for details Specifically, an optical film layer of a conventional backlight module uses a solution of a lower diffuser+two crossed prisms+an upper diffuser, and an emergent angle of light from a light guide plate (an angle with a normal of the screen) generally ranges from 60° to 90°. The lower diffuser has a higher haze (the haze ranges from 80% to 99%), and plays a role in shielding dots and correcting brightness distribution. The prism may gather light at two sides of an edge peak to a middle, and a brightness at a front viewing angle can be improved by using the two crossed prisms vertically in an edge peak direction. The upper diffuser has a lower haze (about 60%), and can reduce suction to the display panel and shield bright spots caused by foreign objects.

An angle θ is defined as full width at half maximum (FWHM) when the brightness decays to 50% of the brightness at the front viewing angle. This parameter may be used to represent a large viewing angle display feature of the display module. Different azimuth angles q have different

TABLE 1

| Display medium | LCD | Paper |
| --- | --- | --- |
| Viewing angle or brightness | A front viewing angle (a direction perpendicular to the screen) has the highest brightness. The larger the viewing angle is, the lower the brightness is, and the smaller a viewing angle range is. A specific viewing angle during use is likely to cause cervical fatigue. | The paper is close to an ideal diffuse reflector, and has a small difference in a reflected light intensity at different angles. |
| Blue light hazard | An LED light source is used, with a peak value of the blue light generally ranging from 445 to 450 and great hazards | A continuous-spectrum light source such as sunlight and a fluorescent lamp is used, with no peak value of blue light and minor hazards |
| Glare | A cover of a display screen is smooth and has obvious glare. | The surface is rough and close to an ideal diffuse reflector, with slight glare. |

Based on the above research situations, the present application discloses a display device for improving a structure of the display screen, achieving effects such as increase of a viewing angle of the LCD, reduction of hazards of the blue light, and reduction of impact of the glare; and therefore achieving a display effect of health and eye protection.

Technical solutions of embodiments of the present application will be described clearly and completely below in conjunction with accompanying drawings of the embodiments of the present application. Apparently, the embodiments described are merely some embodiments rather than all embodiments of the present application. All other embodiments derived by a person of ordinary skill in the art from the embodiments of the present application without creative efforts shall fall within the protection scope of the present application.

Figure 2:
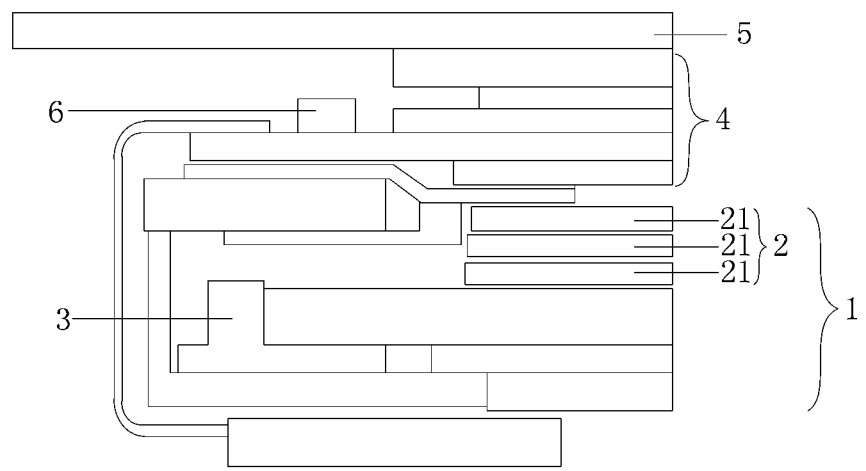
FIG. 2 is a schematic structural diagram of a section of a bezel of a side, close to an IC, of a display device according to an embodiment of the present application.

As shown in FIGS. 1 and 2, the display device according to the embodiments of the present application includes a backlight module 1. The backlight module 1 includes an optical film layer 2, the optical film layer 2 includes at least two diffusers 21 stacked in sequence, and a haze of each of the at least two diffusers 21 ranges from 80% to 99%.

In the embodiments of the present application, a structure of the LCD backlight module is improved, to improve the brightness of the display screen in a large viewing angle range, greatly improve a viewing angle range of the screen, and avoid accommodative fatigue of human eyes.

Figure 3:
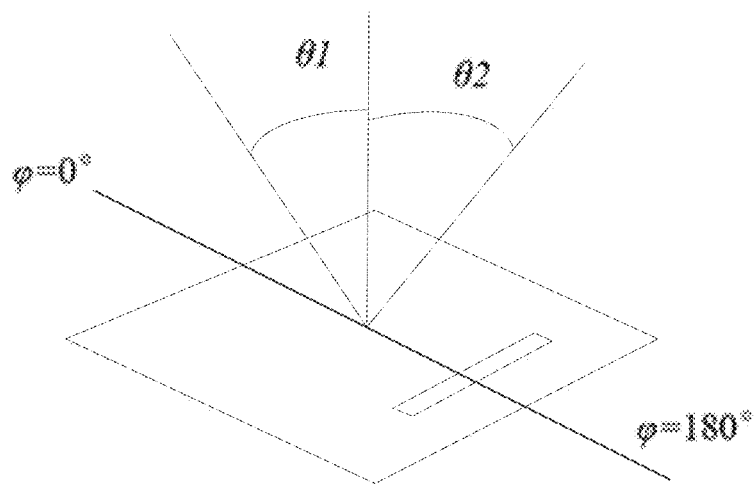
FIG. 3 is a schematic diagram of angles θ when brightnesses at different azimuth angles φ of a display device attenuate to 50% of a brightness at a front viewing angle.
Figure 4:
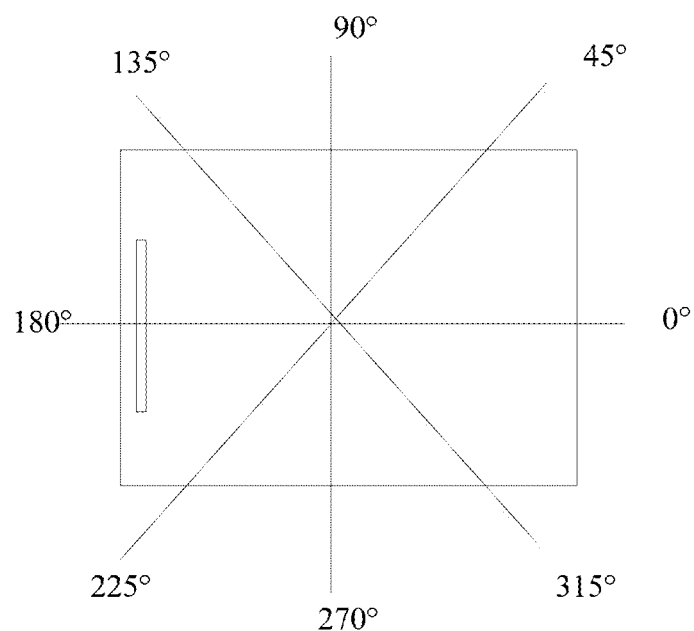
FIG. 4 is a schematic positional diagram of azimuth angles of the display device.

FWHMs, as shown in FIGS. 3 and 4. The FWHM of the conventional backlight module approximately ranges from 20° to 25°.

In the backlight module of the embodiments of the present application, the prism is omitted in the optical film layer, and two or more diffusers with a high haze are used, so that the FWHM of the display module can be improved, thereby greatly enlarging the viewing angle range of the screen and avoiding accommodative fatigue of human eyes.

Exemplarily, as shown in FIGS. 1 and 2, in the display device according to the embodiments of the present application, the optical film layer 2 includes three diffusers 21.

Exemplarily, in the display device according to the embodiments of the present application, the haze of each diffuser is 98%.

Figure 5:
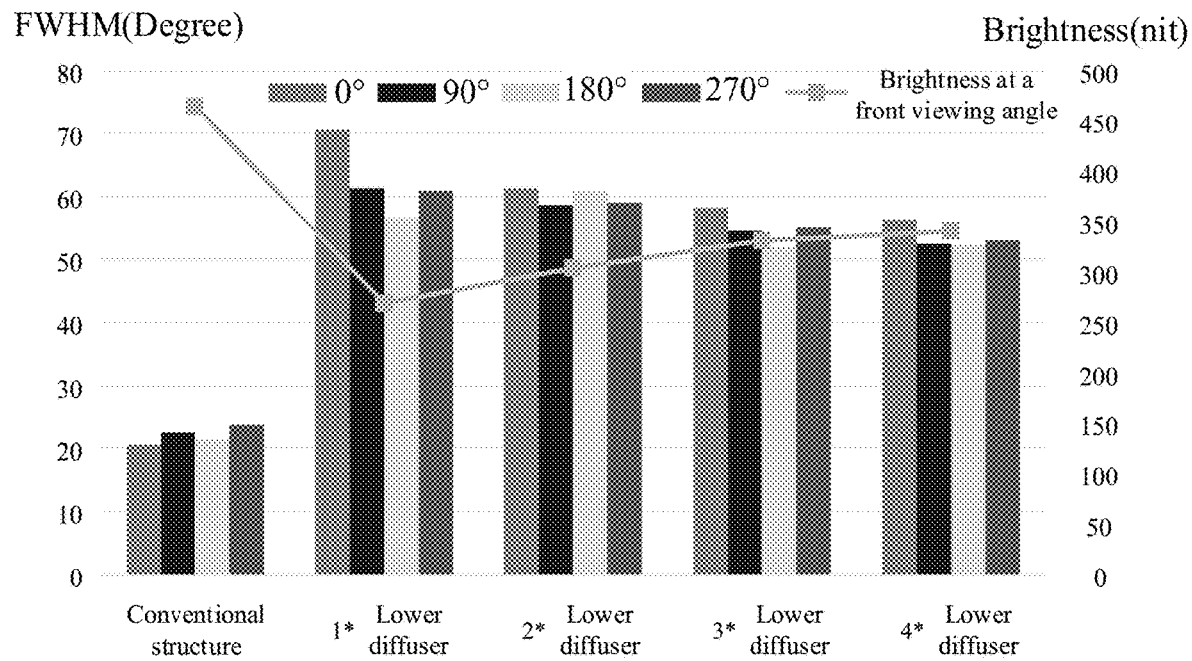
FIG. 5 is a schematic diagram of comparison in terms of a viewing angle and a brightness of different display device solutions according to an embodiment of the present application.

Specifically, in the display device according to the embodiments of the present application, in a case that three diffusers with a haze of 98% are used as the optical film layer, the brightness is merely lost by 20%, but the FWHM can be increased to 50° or higher, as shown in FIG. 5.

As shown in FIG. 5, a conventional structure is a conventional LCD structure; and 1*diffuser, 2*diffuser, 3*diffuser and 4*diffuser refer to LCD structures when the optical film layer is respectively replaced with diffusers (each diffuser has a haze of 98%) of different numbers ranging from 1 to 4. A histogram is used to represent an angle of each LCD structure when its brightness attenuates to 50% of the brightness at the front viewing angle, that is, the FWHM. Columns in different colors are used to represent FWHMs at different azimuth angles. The line chart is used to represent the brightness at the front viewing angle of each LCD structure. As shown in FIG. 5, compared with the conventional structure, FWHM angles of several solutions using one or more diffusers to replace the optical film layer are significantly improved at azimuth angles. In the case of using 1 to 4 diffusers, the FWHM angles can all reach 50° or higher. Moreover, in the case of using 2 to 4 diffusers, the brightness at the front viewing angle is small, FWHM angles at the azimuth angles are closer, and brightness distribution is more uniform, so that the viewing comfort of a user can be improved and viewing fatigue can be relieved.

In a specific embodiment, as shown in FIG. 2, the backlight module further includes an LED light source 3, and an optical band of the LED light source 3 is greater than 455 nm.

Optionally, the optical band of the LED light source is 460 nm.

Specifically, the LED light source according to the embodiments of the present application is suitable for an edge-lit backlight module as shown in FIG. 2 and a direct-type backlight module.

In the embodiments of the present application, by changing a peak value of the LED light source in the backlight module, a peak value of the blue light and a peak value of the blue light hazard weighting function are staggered, thereby effectively reducing a blue light hazard value and mitigating blue light hazards.

Specifically, a blue light hazard irradiation function is as follows:

$$L_B = \sum_{300}^{700} L_\lambda \cdot B(\lambda) \cdot \Delta\lambda$$

where $L_\lambda$ represents an optical intensity, $B(\lambda)$ represents a blue light hazard weighting function, and $\Delta\lambda$ represents a wave width.

Figure 6:
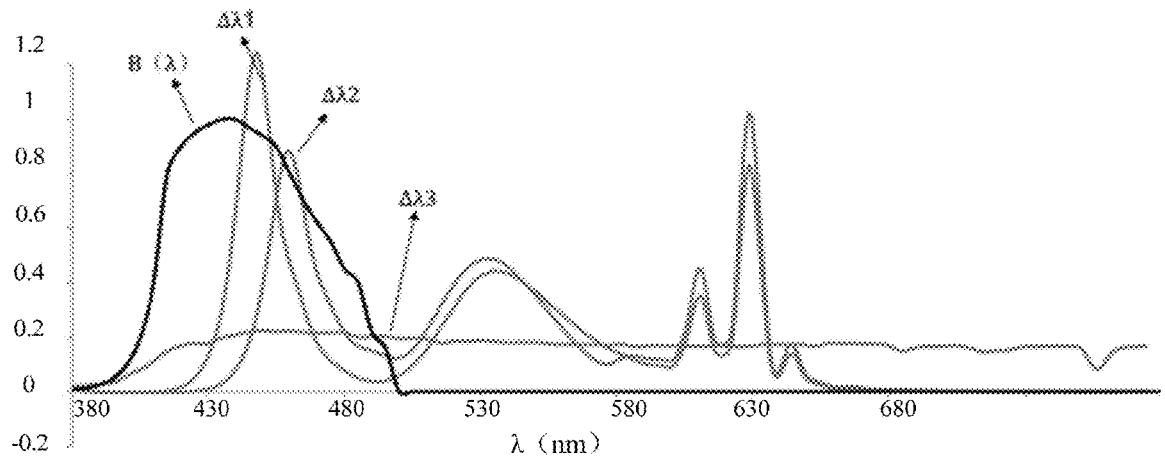
FIG. 6 is a schematic diagram of spectral curves and blue light hazard weighting function curves of display devices and a paper according to an embodiment of the present application.

FIG. 6 shows curves of a spectrum $\Delta\lambda 1$ of the conventional LCD, a spectrum $\Delta\lambda 2$ of an LCD (using an LED chip of 460 nm) according to the embodiments of the present application and a reflection spectrum $\Delta\lambda 3$ of a paper under sunlight. As shown in FIG. 6, the conventional LCD uses an LED chip having a band of 445 nm as a light source, and a blue light weighting function value corresponding to a spectral peak of the band is high. In the embodiments of the present application, the LED chip having a band of 455 nm or higher is used as the light source, so that a peak value of the blue light and a peak value of the blue light hazard weighting function can be staggered.

A specific blue light hazard value may be computed with the above blue light hazard irradiation function formula. Specifically, taking the optical band of the LED light source in the LCD of the embodiments of the present application being 460 nm as an example, the LCD of the embodiments of the present application is compared with the conventional LCD and paper in terms of the blue light hazard, and computation results are shown in Table 2. It can be seen from Table 2 that a blue light hazard irradiation value of the LCD according to the embodiments of the present application is close to a blue light hazard irradiation value of the paper, and is far less than a blue light hazard irradiation value of the traditional LCD, so that the blue light hazards can be effectively reduced and an effect of health and eye protection is achieved.

TABLE 2

| Display medium | Traditional LCD | LCD according to the embodiments of the present application | Paper |
| --- | --- | --- | --- |
| Blue light hazard value | 59.1 | 38.1 | 31.0 |

Specifically, a preparation process of the LED chip includes: substrate manufacturing→epitaxial wafer production→chip forming→device packaging. During epitaxial wafer production, a gallium nitride-based epitaxial wafer is manufactured (in an epitaxial furnace) on a substrate; and a gas-phase reactant, organic metal of group III and NH3 of group V react on a surface of the substrate. In this process, a concentration of element In of group III is increased and reaction time is prolonged as well for a low blue LED chip, and a ratio of element In is increased, so that long-wavelength LED chips can be produced. Then, a required specific peak wavelength may be further screened through a sorting process, and the LED chip with a band required by the LCD of the embodiments of the present application can be obtained in this way.

In a specific embodiment, as shown in FIGS. 1 and 2, the display device according to the present application may further include a display panel 4 and a cover plate 5; where the cover plate 5 is located at a side, facing away from the backlight module 1, of the display panel 4.

Figure 7:
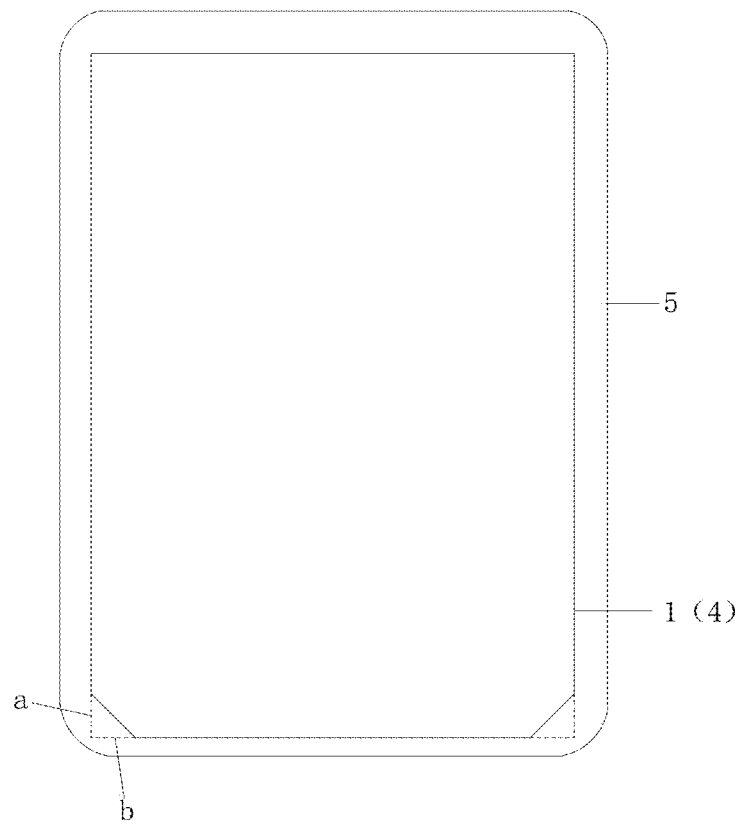
FIG. 7 is a schematic structural diagram of a module of a display device according to an embodiment of the present application.

Specifically, as shown in FIGS. 2 and 7, each of corners of two ends of a bezel of a side, close to an integrated circuit chip 6, of each of the display panel 4 and the backlight module 1 is arranged as a chamfer.

Specifically, as shown in FIGS. 2 and 7, the integrated circuit chip 6 is bound to a bezel at a side of the display panel 4, and corners of the bezel at the side of the display panel 4 and corners of a bezel at the same side of the backlight module 1 are arranged as chamfers.

Exemplarily, chamfers at two ends of the display panel and the chamfers at the two ends of the backlight module are aligned, and a chamfer amount of each of the corners at the two ends of each of the display panel and the backlight module ranges from 0.5 mm to 5 mm.

Specifically, in the present application, the 'chamfer' refers to a corner formed by cutting a right angle of the display panel or the backlight module, and the 'chamfer amount' refers to a length of two cut right-angle sides. As shown in FIG. 7, the chamfer amount ranges from 0.5 mm to 5 mm, that is, a length of a cut right-angle side a and a length of a right-angle side b fall within the range of 0.5 mm-5 mm. For example, the length of the right-angle side a and the right-angle side b may both be 3 mm. In addition, it should be noted that the chamfer in the present application may be cut along a straight line or an arc line, that is, a hypotenuse may be a straight line or an arc line.

The cover plate provides hard, firm and waterproof protection for the LCD display screen, and is mostly made of tempered glass. In order to achieve product design beauty and desirable hand feel, four corners of the cover plate are generally designed in an arc shape, a profile of the cover plate generally exceeds the LCD display module (a display panel+a backlight module) by 5 mm to 10 mm, and an excess portion is used as fixation space during whole machine assembly.

A narrow bezel is an eternal goal of products. Four corners of the conventional LCD display module (a display panel and a backlight module) are all right angles, and further reduction of a portion of the cover plate beyond the LCD display module can lead to the problem of narrow fixation space at corners. In the present application, two corners of a side, close to of the chip, of the LCD display module are designed in the form of chamfers, so that the display panel and the backlight module can be designed to be compact, a bezel of the cover plate can be further reduced, a bezel of the display screen can be reduced, and the screen-to-body ratio can be increased.

Figure 8:
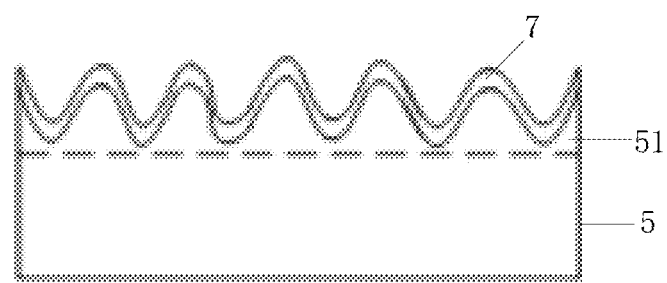
FIG. 8 is a schematic structural diagram of a cover plate and an anti-reflection layer of a display device according to an embodiment of the present application.

In a specific embodiment, as shown in FIG. 8, the cover plate 5 includes an atomization layer 51, the atomization layer 51 is located at a light-emitting side of the cover plate 5, and a haze of the atomization layer 51 ranges from 5% to 70%.

Exemplarily, the atomization layer is formed through a spraying process, a coating process or an etching process.

For example, tempered glass is used as a cover plate body, and an atomization layer may be formed on the glass body through spraying and coating, or a surface structure of the glass body may be changed through acid etching technology to form the atomization layer. Specifically, the atomization layer can reduce reflectivity of light, reduce interference of ambient light, reduce reflection of the screen, have a desirable anti-glare effect, and relieve asthenopia.

Exemplarily, the haze of the atomization layer is 35%.

Theoretically, the greater the haze of the atomization layer is, the better the anti-glare effect is, but more brightness loss is caused. It is verified through experiments that designing the haze of the cover plate as 35% can satisfy requirements of preventing indoor light shadow and high brightness, and achieve a desirable display effect.

In a specific embodiment, the display device according to the present application further includes at least one anti-reflection layer 7. The at least one anti-reflection layer 7 is located at a side, facing away from the display panel 4, of the cover plate 5; and a refractive index of each anti-reflection layer 7 falls between a refractive index of the cover plate 5 and a refractive index of air. In a case that the display device includes two or more anti-reflection layers 7, refractive indexes of the two or more anti-reflection layers 7 decrease sequentially in a direction away from the cover plate 5.

The display device according to the present application uses a plurality of anti-reflection layers for refractive index transition, so that an effect of reducing interface reflection can be achieved. Specifically, according to Frenel formula, reflectivity of two material interfaces having a refractive index of n1/n2 is as follows:

$$R = \left(\frac{n_1 - n_2}{n_1 + n_2}\right)^2.$$

With the cover plate being tempered glass as an example, for a glass/air interface, n1=1, n2=1.52 and reflectivity is about 4.3%. In this case, by setting an anti-reflection layer having a refractive index of 1.0-1.52 between air and the glass, the reflectivity can be reduced.

Exemplarily, the display device according to the embodiments of the present application includes one anti-reflection layer, where a refractive index of the anti-reflection layer is 1.25. Through computation, the reflectivity of the display device can be reduced to 2.2% (reflectivity of an air/anti-reflection layer interface is 1.2%, and reflectivity of an anti-reflection layer/glass interface is 1.0%).

In the same way, by continuously increasing the number of layers of intermediate anti-reflection materials, anti-reflection layers are stacked in a gradual change order of the refractive index, and the interface reflection phenomenon can be further weakened.

Exemplarily, the display device according to the embodiments of the present application includes six anti-reflection layers. It is verified through experiments that reflectivity of the visible light of 380 nm~780 nm can be reduced to less than or equal to 1% by using the refractive index transition of six anti-reflection layers, and a remarkable anti-glare effect is achieved.

Specifically, as shown in FIG. 8, in the display device according to the embodiments of the present application, the atomization layer 51 and the anti-reflection layer 7 can cooperate with other, to reduce surface glare of the display panel, achieve an outstanding anti-glare effect, and eliminate asthenopia and improve viewing comfort.

Specifically, the display device according to the embodiments of the present application has the features of large viewing angles, minor blue light hazards, glare prevention, etc., and can achieve a display effect close to that of a paper as well as an effect of health and eye protection, and significantly improve viewing experience. Moreover, the display device according to the embodiments of the present application can improve the screen-to-body ratio, and facilitate implementation of a narrow bezel. The display device can be applied to display apparatuses such as a monitor, a tablet computer and a mobile phone.

It should be noted that in some embodiments of the present disclosure, the display device can further include other structures depending on actual requirements, which is not limited in the embodiments of the present disclosure. In addition, quantities, materials and specific parameters of the structures according to the embodiments of the present disclosure are not limited to the above embodiments, and reference can made to the above description for their basic requirements, which will not be repeated herein.

Apparently, those skilled in the art can make various modifications and variations to the embodiment of the present application without departing from the spirit and scope of the present application. In this way, if these modifications and variations of the present application fall within the scope of the claims of the present application and their equivalent technologies, the present application is also intended to include these modifications and variations.

What is claimed is:

1. A display device, comprising a backlight module;
   wherein the backlight module comprises an optical film layer,
   the optical film layer comprises at least two diffusers stacked in sequence, and
   a haze of each of the at least two diffusers ranges from 80% to 99%;
   wherein the display device further comprises a display panel and a cover plate; wherein the cover plate is located at a side, facing away from the backlight module, of the display panel;
   wherein the cover plate comprises an atomization layer; wherein the atomization layer is located at a light-emitting side of the cover plate, and a haze of the atomization layer ranges from 5% to 70%; wherein the atomization layer is formed through an etching process;
   or, wherein the display device further comprises at least one anti-reflection layer; wherein the at least one anti-reflection layer is located at a side, facing away from the display panel, of the cover plate; a refractive index of each of the at least one anti-reflection layer falls between a refractive index of the cover plate and a refractive index of air; and in a case that the display device comprises two or more anti-reflection layers, refractive indexes of the two or more anti-reflection layers decrease sequentially in a direction away from the cover plate.

2. The display device according to claim 1, wherein the optical film layer comprises three diffusers.

3. The display device according to claim 1, wherein the haze of each of the at least two diffusers is 98%.

4. The display device according to claim 1, wherein the backlight module further comprises a light emitting diode (LED) light source, and an optical band of the LED light source is greater than 455 nm.

5. The display device according to claim 4, wherein the optical band of the LED light source is 460 nm.

6. The display device according to claim 1, wherein each of corners of two ends of a bezel of a side, close to an integrated circuit chip, of each of the display panel and the backlight module is arranged as a chamfer.

7. The display device according to claim 6, wherein the chamfers at the two ends of the display panel and the chamfers at the two ends of the backlight module are aligned; and a chamfer amount of each of the chamfers at the two ends of each of the display panel and the backlight module ranges from 0.5 mm to 5 mm.

8. The display device according to claim 1, wherein the haze of the atomization layer is 35%.

9. The display device according to claim 1, comprising six anti-reflection layers.

10. The display device according to claim 1, comprising one anti-reflection layer, wherein the refractive index of the anti-reflection layer is 1.25.

* * * * *